Aug. 5, 1952   J. B. ARMITAGE   2,605,677
MILLING MACHINE

Original Filed July 14, 1939   5 Sheets—Sheet 2

INVENTOR
Joseph B. Armitage
BY W. D. O'Connor
ATTORNEY

Aug. 5, 1952     J. B. ARMITAGE     2,605,677
MILLING MACHINE Original Filed July 14, 1939     5 Sheets-Sheet 4

INVENTOR
Joseph B. Armitage
BY W. D. O'Connor
ATTORNEY

Aug. 5, 1952  J. B. ARMITAGE  2,605,677
MILLING MACHINE
Original Filed July 14, 1939  5 Sheets-Sheet 5

FIG. 12

INVENTOR
Joseph B. Armitage
BY W. D. O'Connor
ATTORNEY

Patented Aug. 5, 1952

2,605,677

UNITED STATES PATENT OFFICE 2,605,677

MILLING MACHINE

Joseph B. Armitage, Wauwatosa, Wis., assignor to Kearney & Trecker Corporation, West Allis, Wis., a corporation of Wisconsin Original application July 14, 1939, Serial No. 284,387, now Patent No. 2,379,405, dated July 3, 1945. Divided and this application May 25, 1945, Serial No. 595,819

7 Claims. (Cl. 90—15)

This invention relates generally to machine tools and more particularly to an improved milling machine adapted to perform intricate machining operations with facility and with a high degree of accuracy.

The present specification constitutes a division of application Serial No. 284,387, filed July 14, 1939, which issued July 3, 1945, as U. S. Patent No. 2,379,405.

A general object of the invention is to provide an improved milling machine especially adapted to machine articles of intricate shapes, such as dies and the like, without the necessity of resetting the workpiece in the machine for each of a plurality of machining operations.

Another object is to provide an improved milling machine having a rotary tool supporting spindle mounted for gyratory bodily movement.

Another object is to provide an improved power transmission mechanism for driving and for controlling the movements of a rotary head in a machine tool.

Another object is to provide an improved speed adjusting power transmission mechanism for driving a rotatable element of a machine tool.

Another object is to provide an improved power transmitting mechanism for rotating a bodily movable spindle of a machine tool.

Another object is to provide improved positioning and clamping means for the sliding plates of a belt tightening and adjusting structure.

Another object is to provide an improved handwheel for manually adjusting a machine tool element having a positioning indicating dial and means at the front of the wheel for releasing and clamping the dial in adjusting it.

Another object is to provide an improved locking mechanism for an adjustable position indicating dial.

Another object is to provide an improved oscillatory supporting structure for carrying the power transmitting mechanism connected to drive a bodily movable machine tool element.

Another object is to provide an improved belt driving mechanism for a machine tool element.

Another object is to provide a supporting structure for belt driving mechanism including superimposed plates arranged for sliding movement to permit adjustment of the belts.

Another object is to provide improved clamping means for locking a rotary element of a machine tool in an adjusted position.

Another object is to provide an improved work table supporting structure for a milling machine of the knee type.

Another object is to provide in a machine tool of the knee and column type, a saddle supporting knee arranged to project rearwardly into a recess in the face of the column to provide a long bearing slide for a cooperating saddle.

Another object is to provide improved adjusting means for a position indicating dial on a machine tool.

According to this invention, a milling machine, particularly adapted to perform intricate machining operations on dies and the like is provided with a work supporting table and a cooperating tool supporting spindle mounted for gyratory bodily movement relative to the table. The tool supporting spindle is preferably disposed vertically and is carried by a rotatably mounted head in which it is arranged for radial adjustment to position it for effecting arcuate movement along paths of different radii. The spindle is also arranged for axial feeding movement and it may be moved laterally along any predetermined angularly disposed paths by setting the rotary head at the required angle, the work supporting table being movable in the usual manner along three mutually transverse paths for positioning the work relative to the spindle. The spindle is driven by a motor mounted in the machine frame independently of the rotatable head, the motor being operatively connected to the spindle by an improved speed changing belt transmission mechanism. To accommodate the gyratory movement of the spindle, the driving motor and the speed changing transmission mechanism are carried by an oscillating platform, one end of which moves with the spindle, while the other end is slidably mounted in the frame, the action of the platform being similar to that of a connecting rod. The work supporting structure includes an improved knee provided with a rearwardly extending portion that projects into a recess in the forward base of the column in manner to provide a long and narrow guideway to receive the saddle, the saddle being, likewise, provided with a cooperating rearwardly extending portion. The saddle is of sufficient length to support the table throughout its entire range of movement and it carries speed changing power transmission mechanism for driving the table. The manual means for positioning the work supporting table and for turning the rotary head is provided with releasable hand wheels and improved indicating dial mechanism including locking means actuatable from the front of the respective hand wheels for locking the dials in adjusted position.

The invention is exemplified herein by means of a milling machine of special construction embodying the inventive features. However, it is to be understood that this particular embodiment is intended to be illustrative only and that various other types of machine tools incorporating different structural arrangements coming within the range of equivalents of the features defined in the subjoined claims may be utilized in practicing the invention.

The foregoing and other objects of this invention, which will become more fully apparent from the following detailed specification, may be achieved by the exemplifying machine tool depicted in and described in connection with the accompanying drawings, in which.

The particular machine tool shown in the drawings as exemplifying structure constituting a preferred embodiment of the invention is generally similar in character especially as to the work supporting portions thereof, to a knee and column type milling machine, although it is to be understood that the various novel features of the invention may be incorporated in machine tools of other types and of entirely different construction with equal advantage.

Figure 1:
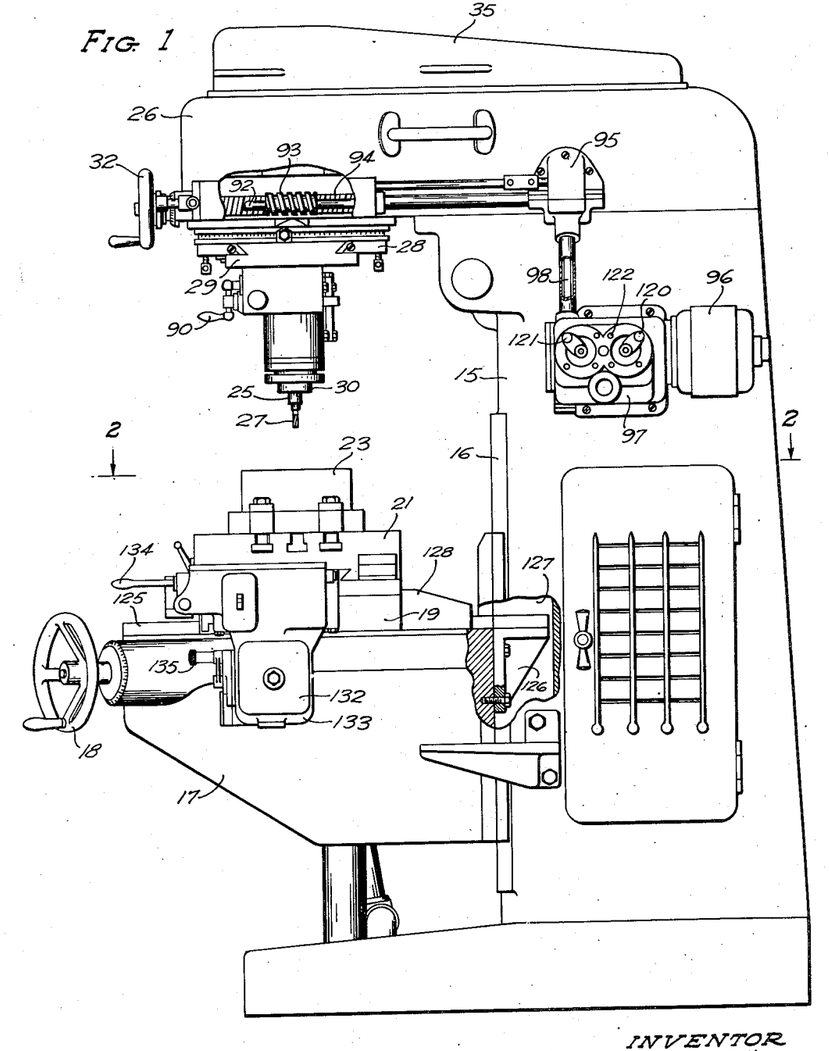
Fig. 1 is a general view in right side elevation of an improved milling machine embodying the novel features of the present invention.
Figures 2, 3, 4:
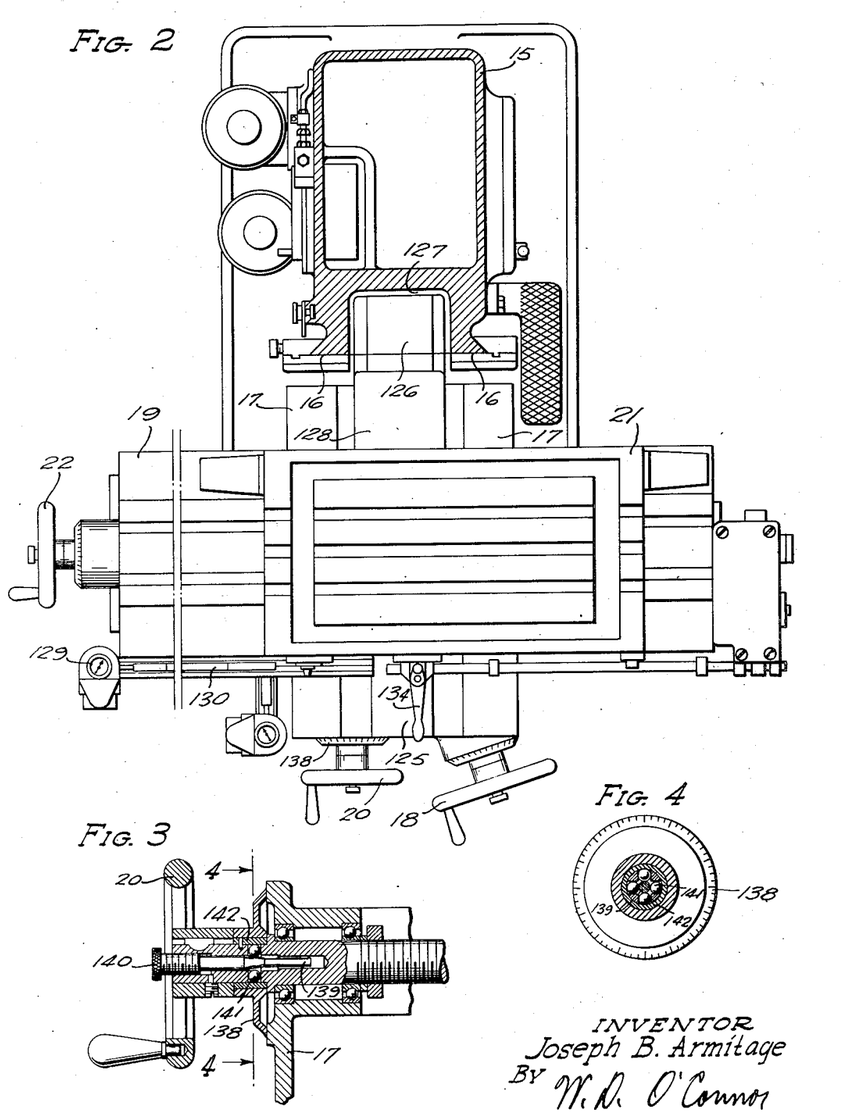
Fig. 2 is a plan view partly in horizontal section, taken along the line 2—2 in Fig. 1, showing the work supporting structure of the machine.
Fig. 3 is an enlarged detail view in horizontal section, showing the position indicator dial adjusting means.
Fig. 4 is another detail view of the dial adjusting means, taken in transverse vertical section along the line 4—4 in Fig. 3.

Referring more specifically to the drawing, the improved milling machine there illustrated is fully described in the following parts of this specification, by way of a complete disclosure of an operative embodiment of the present invention. As shown in the right side elevational view (see Fig. 1), the machine comprises a base and upstanding column member 15 constituting the main frame or supporting element and carrying cooperating work supporting and tool supporting members. As shown in Figs. 1 and 2, the column 15 is provided on its forward face with spaced vertical ways 16 constituting bearing surfaces for guiding a vertically adjustable work supporting structure including a knee 17 that slidably engages the ways and that may be adjustably positioned along them by actuating a hand wheel 18 at the front of the knee. On the top of the knee 17, there is slidably mounted a saddle 19 arranged for transverse movement toward or from the column by means of a hand wheel 20, also disposed at the front of the knee. The saddle 19 supports, in turn, a horizontal work carrying table 21 arranged for longitudinal movement parallel with the face of the column, a hand wheel 22 being provided at the left end of the saddle for actuating the table. By the proper manipulation of the knee, saddle and table, a workpiece 23 carried by the table 21 may be adjusted in three mutually transverse planes to any desired position within the range of the machine.

Figure 5:
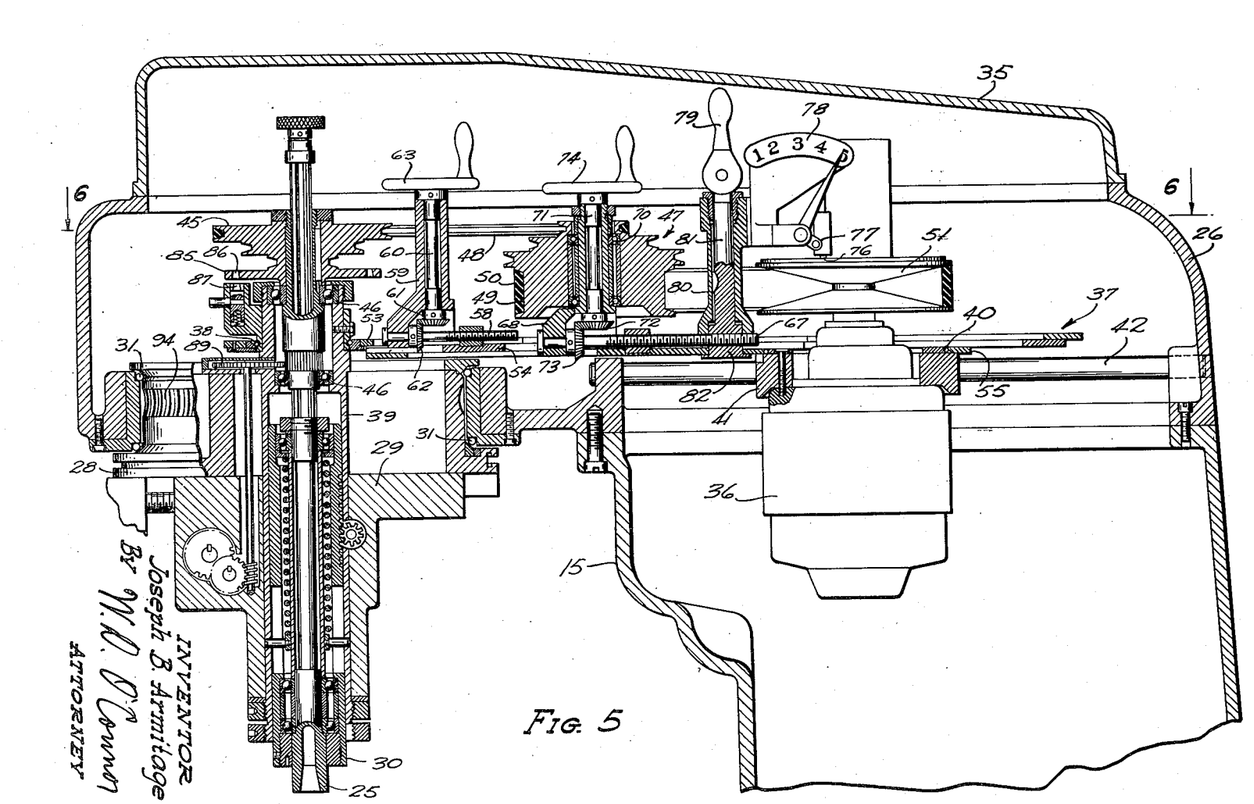
Fig. 5 is a view in vertical section, taken longitudinally through the upper portion of the machine, showing the spindle drive and feed mechanisms.

Above the work carrying table 21, a vertically disposed tool carrying spindle 25 is mounted for bodily gyratory movement in cooperating relationship with the workpiece 23. The tool spindle 25 depends from a forwardly projecting structure or machine head 26 constituting a superstructure mounted on the top of the column 15 in position to present a milling cutter 27 in cooperating relationship with the workpiece 23 on the table 21. As best shown in Fig. 5, the tool spindle 25 is carried in a rotatable supporting head 28 by means of a radially adjustable transverse slide 29 that supports an axially adjustable quill 30 within which the spindle is rotatably mounted. The rotatable head 28 is preferably carried in the forwardly projecting superstructure 26 by means of preloaded ball bearings 31 and may be turned manually by means of a hand wheel 32 to move the eccentrically disposed spindle 25 through a circular or arcuate path of radius determined by the position of the radially movable cross slide 29 to effect gyratory machining operations in manner more fully set forth and claimed in Reissue Patent No. 20,893 to Howard W. Bartholomew, entitled "Milling Machine."

The spindle carrying slide 29 may be adjusted radially of the head 28 along a diametrical line. With the spindle set at a predetermined radial position, the head 28 may be rotated to move the cutting tool 27 in a manner to machine an arcuate or circular form upon the workpiece 23 at any position upon its surface, as determined by the longitudinal and transverse adjustment of the table 21 and saddle 19. Likewise, linear cutting movements at any predetermined angle may be effected by setting the rotary head 28 to position the cross slide 29 at the predetermined angle and then feeding the slide along the angular path by actuating a hand crank, not shown. The various angular and arcuate cutting movements may be correlated to form any desired contours upon the workpiece 23 in predetermined relationship by suitably positioning the workpiece. This is accomplished by actuating the saddle and table hand wheels 20 and 22 respectively, as is more fully explained in the previously mentioned patent.

The mechanism for rotating the spindle 25 to drive the milling cutter 27 is mounted within the forwardly projecting machine head 26 and is made accessible by opening a hinged cover 35 at the top of the machine. As shown in Fig. 5, the source of power for driving the spindle 25 is an electric motor 36 slidably mounted on the supporting superstructure 26 independently of the rotating head 28. An improved power transmission mechanism is provided for transmitting power from the motor 36 in the machine frame to the spindle 25 in the rotary head 28 to drive it at selected speed in whatever position the spindle may assume in its gyratory movement resulting from turning the head. For this purpose, the driving motor 36 and the power transmission mechanism are carried by an oscillating platform structure 37, which is pivotally connected at one end concentric with the spindle 25 and is pivotally and slidably supported at its other end within the rear part of the housing 26 at the top of the column 15, the arrangement being such that the platform moves in the manner of a connecting rod structure of the type used in reciprocating engines.

Figures 6, 7, 8, 9, 10, 11:
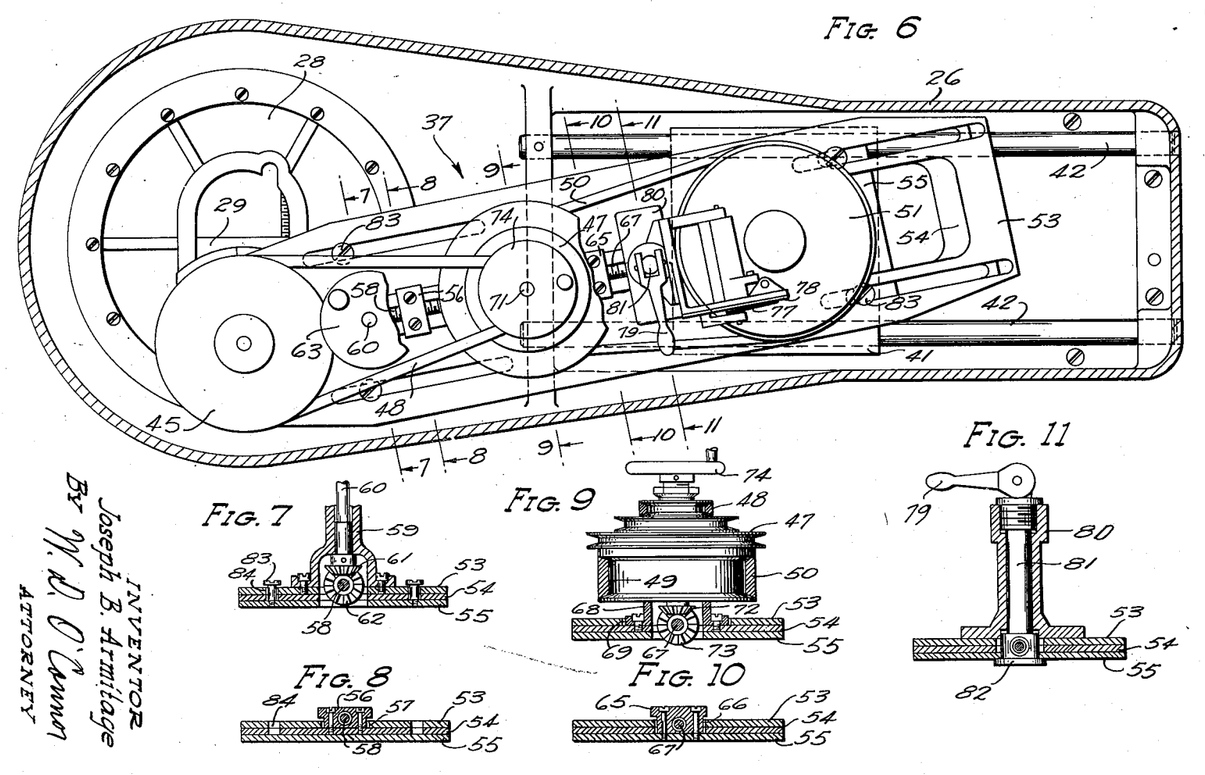
Fig. 6 is a plan view, partly in horizontal section, taken along the line 6—6 in Fig. 5, showing the spindle driving transmission mechanism in the machine head.
Fig. 7 is a fragmentary detail view in vertical section, taken on the line 7—7 in Fig. 6 and showing part of the belt tensioning means.
Fig. 8 is a detail sectional view of another part of the belt tensioning means taken along the line 8—8 in Fig. 6.
Fig. 9 is a detail sectional view of part of a belt adjusting mechanism taken along the line 9—9 in Fig. 6.
Fig. 10 is a detail sectional view of another part of the belt adjusting mechanism, taken along the line 10—10 in Fig. 6.
Fig. 11 is a detail view in vertical section of clamping means for the belt tensioning and speed adjusting mechanisms, taken along the line 11—11 in Fig. 6.

As shown in Fig. 5, the forward end of the platform 37 is rotatably mounted by means of ball bearings 38 on a sleeve 39 that is fixed in the radial slide 29 and constitutes the guiding structure for the vertically movable spindle supporting quill 30. At its other or inner end, the platform 37 is pivotally mounted by means of ball bearings 40 upon a supporting block or cross head 41 that is slidably mounted for movement toward or from the front of the machine upon a pair of parallelly disposed guide rods 42, fixed in the supporting structure 26, as best shown in Figs. 5 and 6. As best shown in Fig. 5, a motor 36 is carried by the cross head 41 with a shaft concentric with the bearing 40 and with its frame depending into the top of the hollow column 15. By this arrangement, the motor 36 is supported in the machine frame in such manner that the relationship between the shaft of the motor and the spindle 25 is maintained constant by the interconnecting linkage or platform structure during the rotary movement of the head 26 in imparting gyratory action to the spindle.

In order to provide for adjusting the speed of rotation of the spindle 25, the spindle is driven by a cone or step pulley 45 that is rotatably mounted on the upper end of the sleeve 39 by means of ball bearings 46 and is arranged to have sliding connection with the spindle 25 to permit axial feeding movement thereof. A complementary cone pulley 47 is rotatably supported near the middle of the platform 37 and is connected by means of a V-belt 48 to the pulley 45, the arrangement being such that the belt may be moved to any one of the three pairs of line belt grooves in the cooperating pulleys in manner to provide three ranges of speeds of rotation for the spindle 25.

The intermediate pulley 47 has integrally formed with it an additional belt groove or single pulley 49 for receiving a relatively wide V-belt 50 that operates it and an adjustable or expansible V-pulley 51 fixed on the shaft of the driving motor 36, the arrangement being such that the driving ratio between the adjustable pulley 51 and the belt groove 49 of the pulley 47 may be varied through infinitely small steps throughout each of the ranges established by the cooperating cone pulley 45 and 47, thereby providing for infinite variation in the speed of the spindle 25 through its entire speed range.

In order to provide for adjusting the tension of the belt 48 and for adjusting the position of the belt 50 in the groove of the adjustable pulley 51, the oscillating platform 37 is made up of three superimposed relatively slidable plates or struts, an upper plate 53 which carries the bearing 38 constituting the rotatable connection with the spindle 25, an intermediate plate 54, which carries the intermediate pulley 47, and a lower plate 55, which carries the bearing 40 constituting the pivotal connection with the sliding cross head 41 to provide for adjusting the tension of the belt 48 or to loosen it for changing its position upon the cone pulleys 45 and 47, a screw and nut mechanism is arranged to effect sliding movement between the upper plate 53 and the intermediate plate 54. As best shown in Fig. 8, the intermediate plate 54 has secured to it a nut element 56 arranged for sliding movement in a groove or slot 57 in the upper plate 53. The nut 56 cooperates with a screw 58 which is rotatably mounted in a bracket 59 secured to the top plate 53, as best shown in Fig. 7. The bracket 59 carries a vertically disposed rotatable control shaft 60 that is provided at its lower end with a bevel pinion 61 meshing with a similar pinion 62 fixed on the screw 58. For actuating the belt tightener, the shaft 60 is provided at its upper end with a hand wheel 63, by means of which it may be rotated to turn the screw 58 within the nut 56 for effecting sliding movement of the intermediate plate 54 relative to the top plate 53.

Likewise, the lower plate 55 may be moved relative to the intermediate plate 54 for the purpose of adjusting the position of the belt 50 within the expansible pulley 51 to change the transmission ratio. For this purpose, the lower plate 55 has secured to it a nut element 65 arranged for sliding movement in slots 66 in the plates 53 and 54. A screw 67 cooperating with the nut 65 is rotatably mounted in a bracket 68 that is secured to the intermediate plate 54, as best shown in Fig. 9 and arranged for sliding movement in a slot 69 in the top plate 53. As shown in Fig. 5, the bracket 68 also constitutes a supporting journal for the intermediate multiple pulley 47, which is mounted therein by means of spaced ball bearings 70. Within the bracket 68, there is journalled a vertically disposed control shaft 71, which extends through the pulley 47 and is provided at its lower end with a bevelled pinion 72 that meshes with a similar pinion 73 fixed on the adjusting screw 67. At its upper end, the control shaft 71 is provided with a hand wheel 74, which may be rotated to turn the screw 67 for effecting sliding movement of the lower plate 55, relative to the intermediate plate 54 in manner to change the position of the belt 50 in the groove of the adjustable pulley 51 for adjusting the driving ratio between the motor 36 and the intermediate pulley 47.

To indicate the driving ratio, the pulley 51 is provided with indicating mechanism including a shoe 76 disposed to engage one face of the pulley and arranged for vertical sliding movement with it when the belt position is changed. The shoe 76 is pivotally connected to one arm of an indicating bell crank 77 in manner to move the other arm thereof relative to an indicating scale 78 upon expansion or contraction of the pulley by noticing the indication on the scale 78 and the position of the V-belt 48 on the cone pulleys and then referring to a speed chart furnished for the purpose, the speed of rotation of the spindle 25 may be determined.

After the sliding plates have been moved to adjusted position, all three plates may be clamped together to constitute a substantially rigid platform by actuating a clamping lever 79 on a bracket 80 resting on the top plate 53. As shown in Fig. 11, the clamping lever 79 is pivoted upon the upper end of a shaft 81 that is provided at its lower end with a shoe 82 fixed in the lower plate 55, the lever having a cam arrangement which bears on the top of the bracket 80 in a manner to draw upward upon the shaft 81 in effecting the clamping action. The three plates are maintained in alignment by means of four guide pins or screws 83 arranged in pairs near the respective ends of the platform and fixed in the lower plate 55, as shown in Fig. 7, the upper and intermediate plates being provided with slots 84 that receive the screws to permit the relative longitudinal sliding movement.

Whenever the hand wheel 63 or the hand wheel 74 is manipulated to effect relative sliding movement of the plates or struts, the distance between the spindle 25 and the driving motor 36 is altered; but since the motor is slidably carried on the guide rods 42, the change in length of the connecting rod or platform structure does not interfere with its oscillatory operation, but merely causes the motor to assume a slightly different position upon the guide rods.

In order to lock the spindle 25 in stationary position for changing the cutter, or the like, there is provided adjacent to the cone pulley 45 and preferably formed integrally with it a locking plate 85 having a plurality of holes 86 disposed in a circle. As shown in Fig. 5, the holes 86 are arranged in such a manner that any one of them may be engaged by a spring pressed locking plunger or pin 87 carried by a bracket fixed on the sleeve 39, the arrangement being such that the pin may be latched in retracted or disengaged position when it is desired to operate the spindle.

The quill driving means, including quill feed rate change and reversing mechanism contained within the slide 29, is fully described in the aforementioned Patent No. 2,379,405. The quill may be power fed through take-off drive gearing 89 connecting with the spindle drive, or it may be manually operated by manipulating a hand wheel 90 operably mounted on the slide 29, as shown in Fig. 1.

The mechanism for turning the rotatable head 28 for establishing the angular position of the cross slide 29 to effect an annular cutting stroke or for moving the cutter spindle 25 in a circular or arcuate cutting stroke is shown generally in Fig. 1. The actuating hand wheel 32 is carried on the projecting end of a driving shaft 92, which carries an adjustable worm 93 that meshes with complementary worm teeth 94 formed on the periphery of the rotatable head structure. The shaft 92 extends rearwardly beyond the worm 93 to a reversing and disconnecting mechanism (not shown) operably mounted within a casing 95. This mechanism is adapted to be selectively operated to drive the head 28 in either direction or to disconnect the power drive therefrom. The reversing and disconnecting mechanism is arranged to be driven at a selected rate by means of a driving motor 96 and an interconnecting speed changing gear box 97. A vertically disposed shaft 98 connects the gear box 97 with the reversing mechanism.

Figure 12:
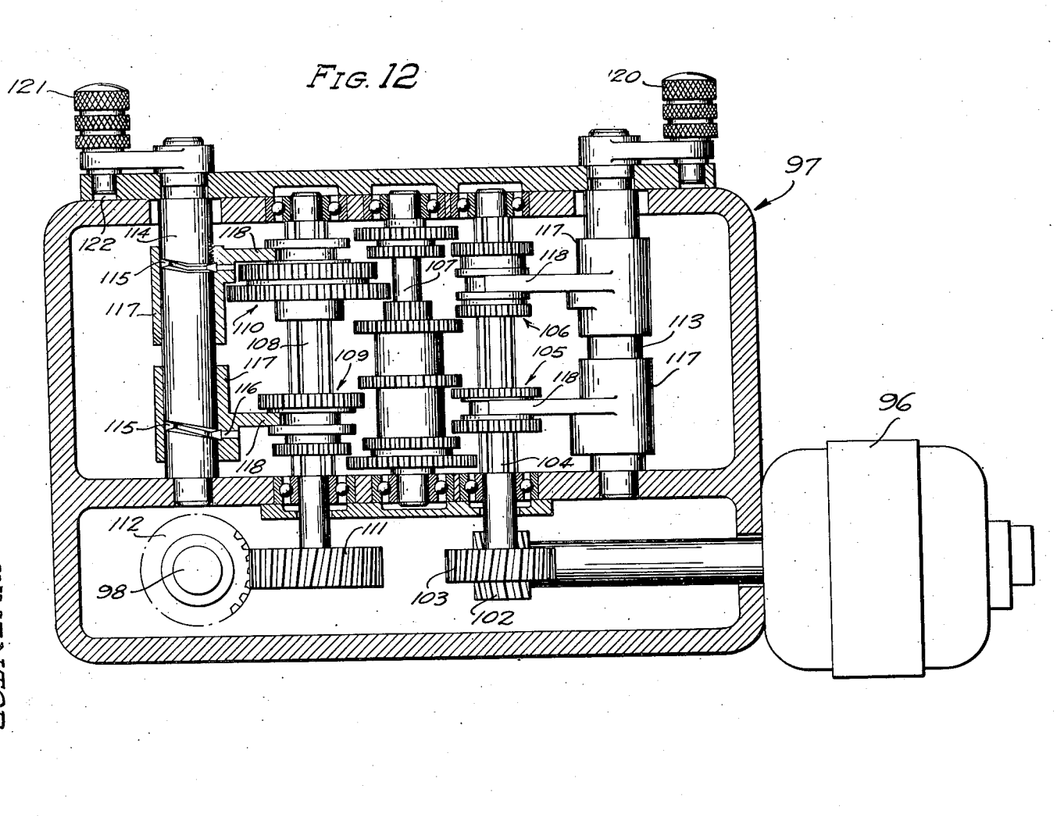
Fig. 12 is an expanded view, largely in section, of the power transmission mechanism for revolving the spindle carrying head of the machine.

As shown in Fig. 12, the shaft of the rotary head driving motor 96 is provided with a worm 102 disposed within the housing of the transmission mechanism 97 and having meshing engagement with a worm wheel 103 fixed on a splined shaft 104 journaled in the housing. Slidably mounted on the splined shaft 104 are two gear couplets 105 and 106 arranged to be meshed selectively with complementary gear wheels fixed on an intermediate shaft 107. A second splined shaft 108 is likewise provided with two slidably mounted gear couplets 109 and 110 that are also adapted to be meshed selectively with complementary gear wheels on the intermediate gear shaft 107. By this arrangement, the splined shaft 108 may be driven at any one of sixteen different speeds by suitably positioning the various shiftable couplets. As shown, the shaft 108 is provided with a spiral gear 111, which meshes with a complementary spiral gear 112 fixed on the lower end of the reverser driving shaft 98, the arrangement being such that by means of the rate changing gear box and the reverser mechanism, the rotary head 28 may be turned by power selectively in either direction at any one of the sixteen speed rates.

The apparatus for positioning the shiftable gear couplets in the speed changing box 97 includes a rotatable cam shaft 113, associated with the couplets 105 and 106 and a similar cam shaft 114 associated with the couplets 109 and 110. Each of the cam shafts, as indicated with regard to the cam shaft 114 in Fig. 12, is provided with two circumferential cam grooves 115, each of which is engaged by a cam follower or pin 116 carried within a sleevelike shifting element 117 encircling and slidably mounted on the cam shaft, each sleeve element being provided with an extending shifting fork 118 that engages a cooperating shifting groove in the corresponding gear couplet in the usual manner. By this arrangement, each of the sleeves 117 may be moved longitudinally by engagement of the cam follower 116 with the cam groove 115 as the cam shaft is rotated, its longitudinal movement being properly guided by reason of its sliding engagement with the periphery of the cam shaft whereby the usual auxiliary guide rod may be dispensed with.

The cam shafts 113 and 114 are provided at their outer ends with actuating crank handles 120 and 121, respectively, each having a locking pin which may be engaged in any one of four equally spaced locking holes 122 in the front of the gear box, as best shown in Fig. 1. The cam grooves are so arranged that only one couplet gear on each of the splined shafts 104 and 108 may be engaged with a cooperating gear on the intermediate shaft 107 at any one time. By positioning the two adjusting cranks 120 and 121 in accordance with a chart furnished, the rate change gearing may be set in a manner to provide any one of sixteen available speed rates for revolving the spindle carrying rotatable head 28.

The work supporting structure comprising the knee 17, the saddle 19 and the table 21 is constructed to support the workpiece 23 in such a manner that it may be positioned relative to the tool spindle 25 with a high degree of precision. To provide for guiding the saddle 19 accurately in traversing movements along the knee 17, a relatively long and narrow guideway 125 is formed on the top of the knee as shown in Figs. 1 and 2. In order that the guideway may be of maximum length, there is provided on the rear of the knee structure an extension member 126 which, in this instance, is constituted by a bracket bolted to the knee although the extension might be formed integrally with the knee casting. The extension member 126 is shaped to constitute an integral part of the guideway 125 and it is disposed to project rearwardly into a vertically extending recess 127 formed in the forward face of the column 15 between the guideways 16 and of such dimensions as to permit unrestricted movement of the extension 126 therein when the knee is adjusted vertically. The saddle 19 is, likewise, provided with a complementary rearwardly extending member 128, which is adapted to slidably engage the knee extension 126 when the saddle is moved to its rearward position adjacent to the column face. By this arrangement, the length of the guiding bearing surfaces between the saddle and the knee is materially increased, thereby reducing the likelihood of canting or turning of the saddle relative to the knee and increasing the accuracy of its relationship with the knee.

The saddle 19 presents a relatively long upper bearing surface for receiving the work supporting table 21, the arrangement being such that the table is, at all times, supported throughout its entire length upon the bearing surface, the table being relatively short and so arranged that it does not overhang either end of the saddle at any time. Although, in this embodiment of the invention, the table 21 is shown supported upon the knee and saddle structure, it is to be understood that the table might, alternatively, be supported upon a fixed structure, such as is utilized in a machine of the bed type.

For precisely positioning the table, there is provided a dial indicator 129 arranged to cooperate with indicating rods 130 carried by the saddle and disposed to be engaged by an abutment mounted on the table by which the rods are moved into engagement with the indicator 129 for actuating it in a well known manner. The various guiding and supporting surfaces of the relatively moving work supporting elements and the screw and nut mechanisms for moving them are precisely fitted in a manner to obviate all looseness and backlash.

Longitudinal feeding movement of the work supporting table 21 may be effected by power derived from a feed driving motor 132 that is connected to actuate a rate changing gear transmission 133, which is similar in construction and operation to the gear changing mechanism 97 for driving the rotary head 28. As best shown in Fig. 1, both the motor 132 and the transmission 133 are mounted beneath the right end of the saddle 19, the transmission mechanism being connected to the table screw by means of reversing and disconnecting gearing similar to the spindle head reversing mechanism. The reversing mechanism may be actuated by a control lever 134 extending at the front of the machine, the arrangement being such that the table may be driven in either direction selectively and at any one of sixteen speeds, as determined by the setting of the control levers 135 on the gear box 133. It is to be understood that the motor 132 and the gear box 133 can also be readily connected to drive the saddle actuating screw selectively, or that another similar motor and gearbox could be provided for the purpose of driving the saddle screw independently.

Each of the several micrometer dials associated with the various manually actuated positioning devices for the movable elements of the machine is arranged to be released readily for turning it relative to its associated adjusting member in order that it may be set at an initial position from which measuring movement of the machine element may be effected. As shown in Figs. 3 and 4, with respect to a micrometer dial 138 associated with a saddle cross feeding mechanism, the dial is arranged to be clamped in fixed position relative to the cross feeding screw by means of a locking screw 139, which extends to the front of the associated hand wheel 20 concentric therewith and is provided at its forward or outer end with a knurled actuating knob 140 that is readily accessible for clamping or unclamping the dial.

As shown, the screw 139 is threaded in the actuating shaft which carries the hand wheel 20 and is provided at its inner end with a tapered or conical portion disposed between and acting upon a plurality of equally spaced clamping balls 141. When the locking screw 139 is turned by the knob 140 in manner to move it inwardly, the conical end portion exerts outward pressure upon the balls 141, forcing them against a slotted clamping sleeve 142 that is pinned to the shaft of the saddle screw, thereby expanding it into frictional clamping engagement with the inner surface of the hub portion of the indicating dial 138. By this arrangement, the dial may be released from the traversing screw readily by turning the knob 140 to withdraw the locking screw 139, whereupon the dial 138 may be turned to the desired position after which it may again be clamped to the shaft by turning the knob 140 to tighten the locking screw 139.

From the foregoing description and explanation of the operation of the disclosed embodiment of this invention, it is apparent that there has been provided an improved highly versatile machine tool, capable of being manipulated in a manner to effect cutting strokes of intricate and precise character in accordance with specified dimensions.

Although a single embodiment of the invention has been described in considerable detail for the purpose of fully disclosing a practical exemplary apparatus, it is to be understood that the apparatus herein described is intended to be illustrative only and that the various inventive features thereof may be incorporated in other structural forms, without departing from the spirit and scope of the invention, as defined in the subjoined claims.

The principles of the invention having now been fully explained in connection with the foregoing description of the illustrative embodying apparatus, the invention is hereby claimed as follows:

1. In a machine drive mechanism, a supporting structure comprising a first plate pivotally connected at one end to one element of said machine, an intermediate plate slidably connected to said first plate, a third plate slidably connected to said intermediate plate and pivotally connected at one end to another element of said machine, a pulley carried by each of said plates, belts interconnecting said pulleys, means to move said plates relative to each other to tighten said belts upon said pulleys, and a single clamping device disposed to clamp said three plates together to retain said belts in tightened condition.

2. Drive mechanism for a machine tool element, comprising a driven cone pulley, a complementary driving cone pulley mounted for bodily movement relative to said driven cone pulley, a connecting belt encircling said cooperating pulleys, means for effecting bodily relative movement of said pulleys to tighten said belt, a single pulley operatively connected to one of said cone pulleys, an expansible pulley complementary to and mounted for bodily movement relative to said single pulley, a connecting belt encircling said expansible pulley and said single pulley, means for effecting bodily relative movement between said expansible pulley and its cooperating pulley to change the driving ratio thereof, and a single clamping element mounted on said movement effecting means to provide for positive retention of said pulleys in any adjusted positions.

3. In a belt and pulley transmission mechanism, a supporting structure comprising a first plate pivotally mounted at one end concentric with a rotatable spindle, an intermediate plate slidably connected to said first plate, a third plate slidably connected to said intermediate plate and movably mounted at one end, a pulley carried by each of said plates, means operatively connecting the pulley on said first plate to drive the spindle, power actuated means connected to drive the pulley on said third plate, belts interconnecting said pulleys, and means to move said plates relative to each other to adjust said pulleys to said belts.

4. In a driving mechanism for a bodily movable spindle, a cone belt pulley operatively connected to drive said spindle, a strut connected to move with said spindle driving cone pulley, a second strut slidably connected to said first strut, a complementary cone pulley carried by said second strut, a belt interconnecting said cone pulleys, means for effecting sliding movement of said struts to tighten said belt, a single pulley operatively connected to said strut mounted cone pulley, a third strut slidably connected to said second strut, an expansible pulley complementary to said single pulley and carried by said third strut, a belt interconnecting said single pulley and said expansible pulley, means for effecting sliding movement of said second and third struts to adjust the driving ratio of said expansible pulley, and power operated means mounted for movement with said third strut and operatively connected to drive said expansible pulley.

5. In a mechanism for transmitting power to a driven member, a supporting member comprising a plurality of superimposed elongated plates, means rotatably supporting one end of one of said plates concentrically with said driven member, a cone pulley mounted on said driven member, a complementary cone pulley carried by an intermediate one of said plates, a belt encircling said pulleys, means to move said intermediate plate relative to said first plate to adjust the tension of said belt, a source of power carried by a third one of said plates, a transmission mechanism including an expansible pulley and a belt arranged to transmit power from said power source on said third plate to said cone pulley on said intermediate plate, and means to move said third plate relative to said intermediate plate to adjust the ratio of power transmission between said expansible pulley and said cone pulley.

6. In a belt and pulley transmission mechanism, a driven shaft, a cone pulley concentrically mounted on said driven shaft, a flat plate disposed to rotatably carry said pulley and driven shaft, a second flat plate slidably mounted on said first flat plate, an intermediate pulley rotatably mounted on said second flat plate, a third flat plate slidably mounted on said second flat plate, an adjustable pitch driving pulley rotatably mounted for lateral adjustment by said third flat plate, and belts interconnecting said pulleys, said three plates being slidably disposed for movement in parallelly spaced planes whereby movement between said first plate and said second plate provides a belt adjusting and tensioning means between said driven pulley and said intermediate pulley, and movement between said second and third flat plates provides belt adjusting means between said intermediate pulley and said driving pulley.

7. A belt and pulley transmission comprising an adjustable sheave driving pulley, an intermediate gang pulley, a driven cone pulley, a strut disposed to rotatably carry said driven pulley, a second strut slidably connected with said first strut and disposed to rotatably support said gang pulley, a belt interconnecting said driven pulley with said gang pulley, a third strut slidably connected with said second strut and disposed to rotatably carry said adjustable driving pulley, a belt interconnecting said adjustable driving pulley with said intermediate gang pulley, and adjusting means selectively operable to effect sliding movement in a single plane between said first and second struts and cause an adjustment of said first named belt on said driven cone pulley, and a second adjusting means selectively operable to effect sliding movement in another parallel plane between said second strut and said third strut and cause an adjustment of said second named belt on said adjustable driving pulley and said intermediate pulley, whereby the selective adjustment of said three pulleys serves to provide an infinitely variable speed range adjustment between said driving pulley and said driven pulley.

JOSEPH B. ARMITAGE.

REFERENCES CITED

The following references are of record in the file of this patent:

UNITED STATES PATENTS

| Number | Name | Date |
|---|---|---|
| 1,235,437 | Chard | July 31, 1917 |
| 1,339,984 | Runge | May 11, 1920 |
| 1,819,889 | Getz | Aug. 18, 1931 |
| 1,917,507 | Demkier et al. | July 11, 1933 |
| 1,972,827 | Nenninger | Sept. 4, 1934 |
| 2,019,774 | Woytych | Nov. 5, 1935 |
| 2,080,319 | Kingsbury | May 11, 1937 |
| 2,108,356 | Twomley | Feb. 15, 1938 |
| 2,179,053 | Reeves | Nov. 7, 1939 |
| 2,202,425 | Marsilius | May 28, 1940 |
| 2,204,841 | Zwick | June 18, 1940 |
| 2,245,889 | Windle | June 17, 1941 |
| 2,340,210 | Armitage et al. | Jan. 25, 1944 |
| 2,364,328 | Thorsberg | Dec. 5, 1944 |
| 2,379,405 | Armitage | July 3, 1945 |

FOREIGN PATENTS

| Number | Country | Date |
|---|---|---|
| 208,370 | Great Britain | Dec. 20, 1923 |